United States Patent
Kawasaki

(10) Patent No.: US 11,019,262 B2
(45) Date of Patent: May 25, 2021

(54) OMNIDIRECTIONAL MOVING IMAGE PROCESSING APPARATUS, SYSTEM, METHOD, AND RECORDING MEDIUM

(71) Applicant: Gaku Kawasaki, Kanagawa (JP)

(72) Inventor: Gaku Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/753,910

(22) PCT Filed: Nov. 12, 2018

(86) PCT No.: PCT/JP2018/041842
§ 371 (c)(1),
(2) Date: Apr. 6, 2020

(87) PCT Pub. No.: WO2019/123890
PCT Pub. Date: Jun. 27, 2019

(65) Prior Publication Data
US 2020/0366839 A1    Nov. 19, 2020

(30) Foreign Application Priority Data
Dec. 18, 2017 (JP) .............................. JP2017-242107

(51) Int. Cl.
*H04N 5/232* (2006.01)
*G06T 3/00* (2006.01)
(Continued)

(52) U.S. Cl.
CPC ......... *H04N 5/23238* (2013.01); *G06T 5/006* (2013.01); *H04N 5/2628* (2013.01)

(58) Field of Classification Search
CPC ... H04N 5/23238; H04N 5/2628; G06T 5/006
(Continued)

(56) References Cited

U.S. PATENT DOCUMENTS

| 10,681,268 B2 * | 6/2020 | Yamamoto ............. H04N 5/232 |
| 2014/0071227 A1 * | 3/2014 | Takenaka ........... H04N 5/23238 |
| | | 348/36 |

(Continued)

FOREIGN PATENT DOCUMENTS

| JP | 2013-214947 | 10/2013 |
| JP | 2017-147682 | 8/2017 |
| WO | WO2015/174547 A1 | 11/2015 |

OTHER PUBLICATIONS

International Search Report and Written Opinion dated Jan. 24, 2019 in PCT/JP2018/041842 filed on Nov. 12, 2018.
(Continued)

*Primary Examiner* — Susan E. Hodges
(74) *Attorney, Agent, or Firm* — Oblon, McClelland, Maier & Neustadt, L.L.P.

(57) ABSTRACT

An image processing apparatus including a storage unit, a correction unit, and an output unit. The storage unit stores moving-image data including a plurality of frames captured by an image-capturing device communicable with the image processing apparatus, time-series data of an inclination angle with reference to a reference direction of the image-capturing device, and time-series data of an angle velocity of the image-capturing device. The correction unit, based on the time-series data of the angle velocity, rotates an image of each of the plurality of frames of the moving-image data to reduce a rotational distortion around the reference direction within a prescribed frequency range. The output unit outputs image data of the rotated image of each of the plurality of frames to an external device communicable with the image processing apparatus.

10 Claims, 13 Drawing Sheets

(51) Int. Cl.
*G06T 5/00* (2006.01)
*H04N 5/262* (2006.01)

(58) Field of Classification Search
USPC .......................................................... 348/36
See application file for complete search history.

(56) References Cited

U.S. PATENT DOCUMENTS

| | | |
|---|---|---|
| 2014/0104446 A1 | 4/2014 | Kawasaki |
| 2014/0204226 A1 | 7/2014 | Murakami et al. |
| 2015/0062363 A1 | 3/2015 | Takenaka et al. |
| 2016/0269632 A1* | 9/2016 | Morioka ................ H04N 5/247 |

OTHER PUBLICATIONS

Johannes Kopf: "360° video stabilization", ACM Transactions on Graphics(TOG), ACM, US, vol. 35, No. 6, Nov. 11, 2016 (Nov. 11, 2016), p. 1-9.

\* cited by examiner

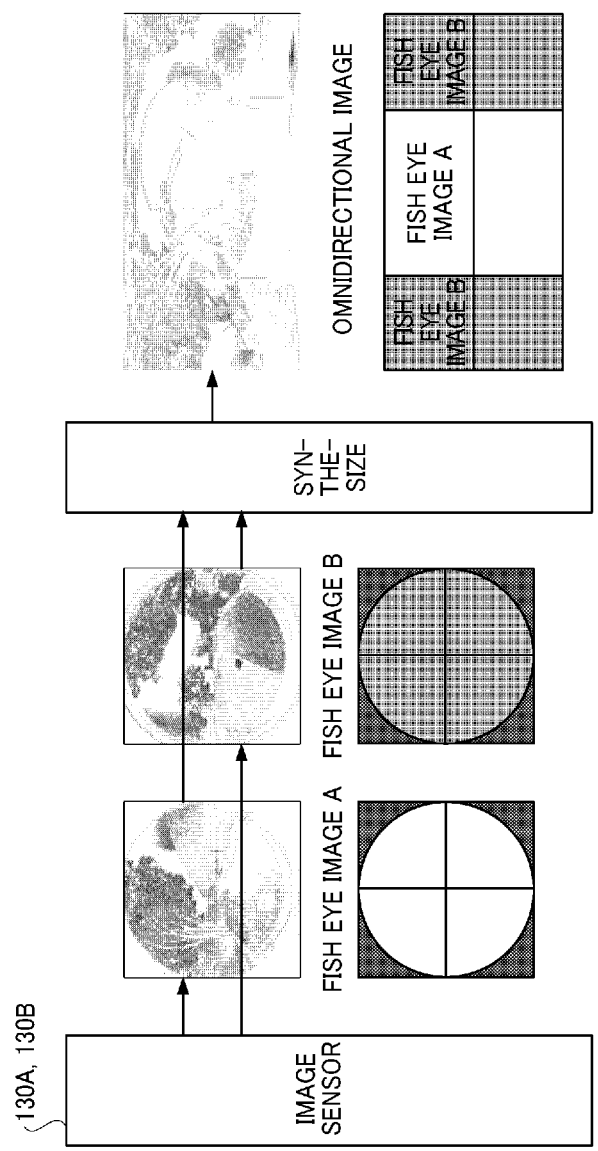

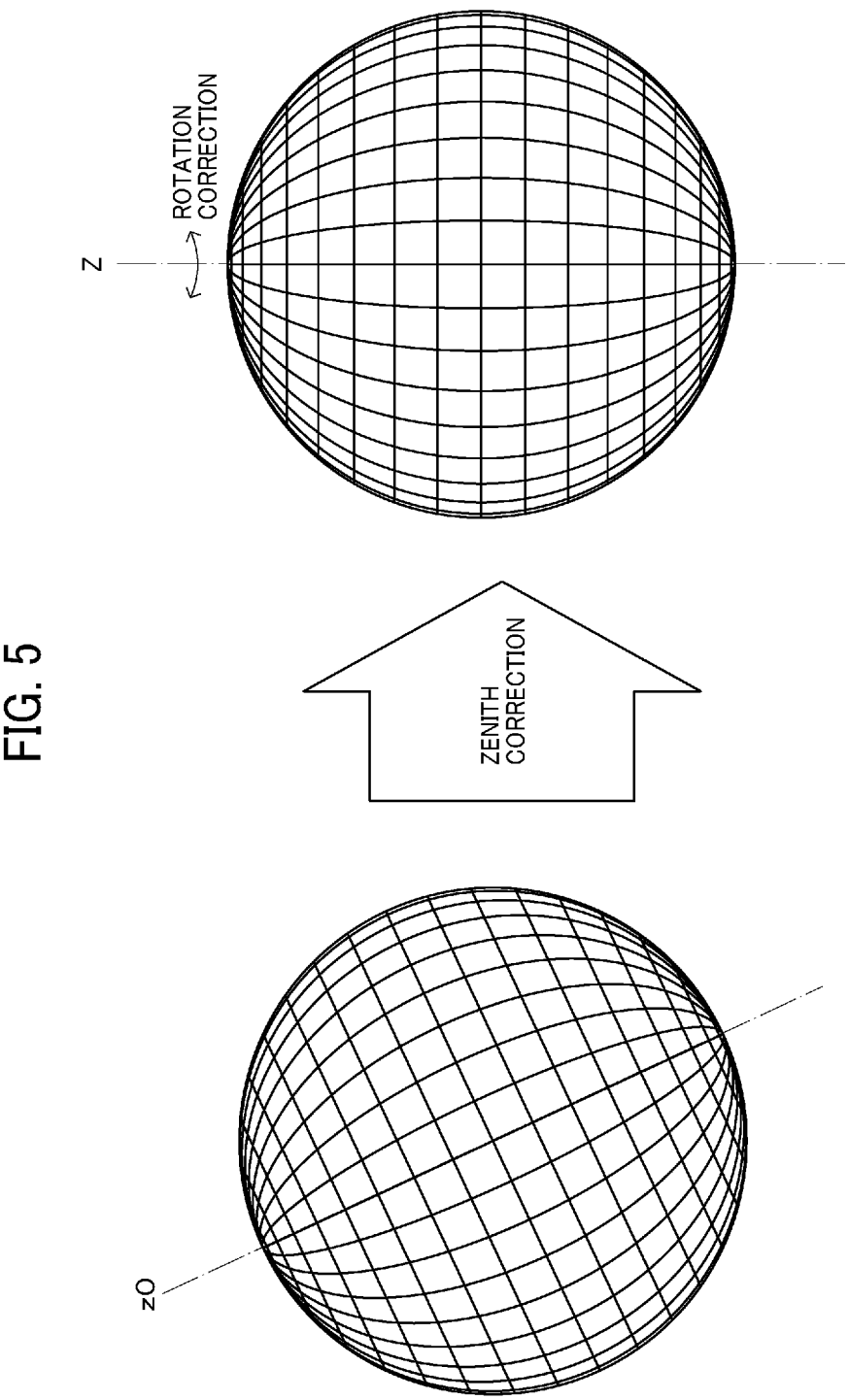

ROTATION CORRECTION
◄──────►

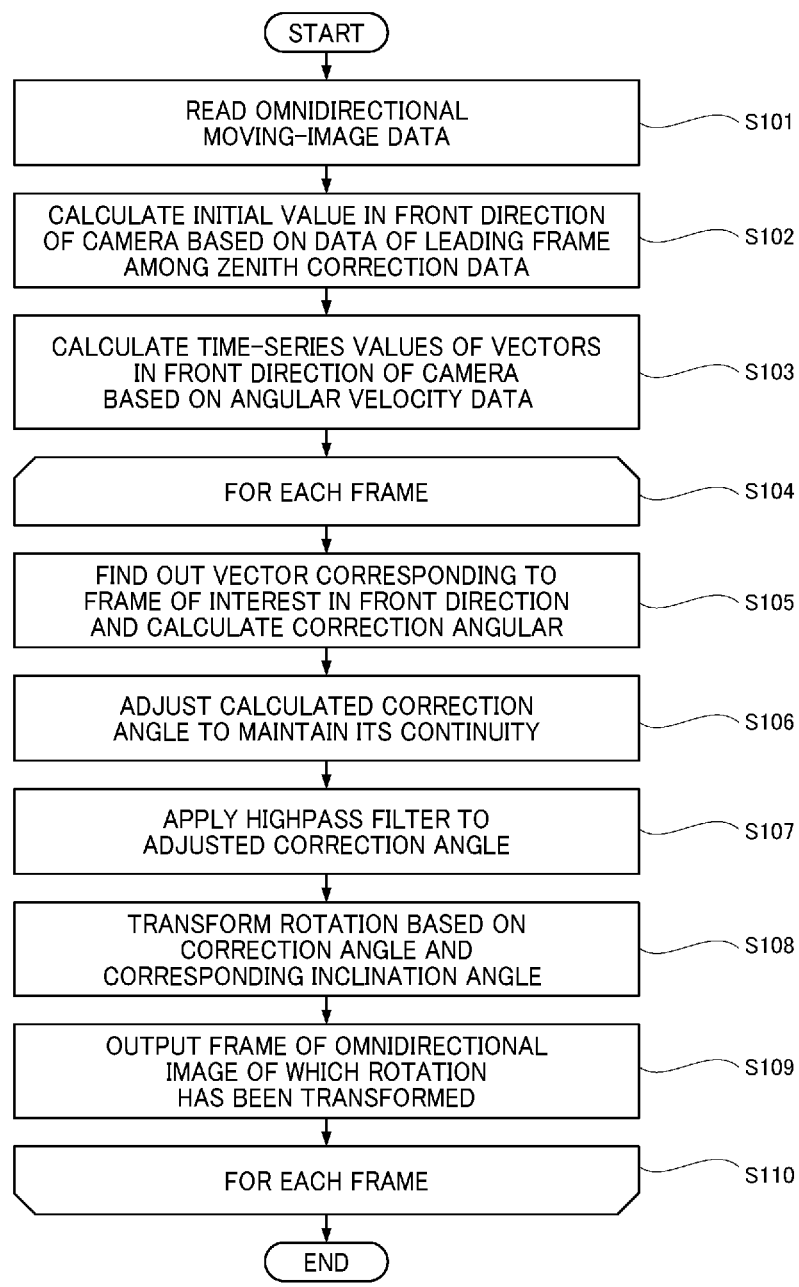

OMNIDIRECTIONAL MOVING IMAGE PROCESSING APPARATUS, SYSTEM, METHOD, AND RECORDING MEDIUM

TECHNICAL FIELD

The embodiments of the present disclosure relate to an image processing apparatus, an image processing system, image processing method, and recording medium.

BACKGROUND ART

In recent years, hand-held cameras capable of capturing still images or moving images with a hemispherical or omnidirectional field of view are widely used. With such hand-held cameras, it is difficult to accurately control the position (angle) of the camera when shooting. In view of such a situation, there are known cameras capable of correcting the inclination of an image captured with the camera body inclined.

The technology for correcting the inclination of an image is disclosed, for example, in JP-2013-214947-A. JP-2013-214947-A discloses an image capturing apparatus having two fish-eye lenses that calculates a transformation parameter for transforming a fish-eye image into a holomorphic image, in accordance with an inclination angle detected by an acceleration sensor disposed inside the image capturing apparatus for detecting an inclination angle of the image capturing apparatus with reference to the vertical direction. However, the correction device disclosed in JP-2013-214947-A fails to correct the rotational distortion of the image around the vertical direction, which is because only the correction for the inclination is made using the acceleration sensor in the apparatus of JP-2013-214947-A.

Further, JP-2017-147682-A discloses an omnidirectional imaging system including an image capturing unit, an image synthesizing unit that creates omnidirectional frame data, a posture detecting unit that detects posture information of the image capturing unit, a correction-amount calculating unit that generates correction-amount data for transforming the coordinates of the omnidirectional frame data based on the posture information, and an associating unit that associates the omnidirectional frame data with the correction-amount data to obtain an omnidirectional image. In the omnidirectional imaging system of JP-2017-147682-A, the correction-amount calculating unit generates, for the omnidirectional frame data, the correction-amount data used to correct the inclination with reference to the vertical direction in the global coordinate and to remove a small vibration component from the horizontal plane vibration, thus to transmit the correction-amount data to the associating unit.

However, the technology disclosed in JP-2017-147682-A adversely increases the load during the shooting because the posture information of the image capturing unit is detected and the correction-amount data is calculated during the shooting. Further, since only the correction amount data used to remove the small vibration component within the horizontal plane in the global coordinate system is stored in association with the omnidirectional frame data, the information regarding the small vibration component is unavailable in the system of JP-2017-147682-A.

CITATION LIST

Patent Literature

[PTL 1] JP-2013-214947-A
[PTL 2] JP-2017-147682-A

SUMMARY OF INVENTION

Technical Problem

It is difficult to capture an image with the stationary position and posture while holding the camera with a hand. If images are captured with the camera body inclined, the zeniths of the images are misaligned and the horizontal line is distorted unless the zenith correction is performed. If the camera body rotates due to, for example, camera shake, the image blurs along the horizontal line unless the rotation correction is performed.

Solution to Problem

In view of the above, there is provided image processing apparatus including a storage unit, a correction unit, and an output unit. Advantageously, the storage unit stores moving-image data including a plurality of frames captured by an image-capturing device communicable with the image processing apparatus, time-series data of an inclination angle with reference to a reference direction of the image-capturing device, and time-series data of an angle velocity of the image-capturing device. The correction unit, based on the time-series data of the angle velocity, rotates an image of each of the plurality of frames of the moving-image data to reduce a rotational distortion around the reference direction within a prescribed frequency range. The output unit outputs image data of the rotated image of each of the plurality of frames to an external device communicable with the image processing apparatus.

Advantageous Effects of Invention

Accordingly, the rotational blur of the image around the prescribed reference direction can be effectively corrected.

BRIEF DESCRIPTION OF DRAWINGS

The aforementioned and other aspects, features, and advantages of the present disclosure will be better understood by reference to the following detailed description when considered in connection with the accompanying drawings. The accompanying drawings are intended to depict embodiments of the present disclosure and should not be interpreted to limit the scope thereof. The accompanying drawings are not to be considered as drawn to scale unless explicitly noted.

FIG. 4A is a data flow diagram of the omnidirectional moving-image system according to an embodiment of the present disclosure.

FIG. 5 is an illustration of zenith correction and rotation correction of an omnidirectional image in the omnidirectional moving-image system according to an embodiment of the present disclosure.

FIG. 7 is a flowchart of an omnidirectional moving-image correction processing performed by the omnidirectional camera in FIG. 1.

DESCRIPTION OF EMBODIMENTS

Figure 1:
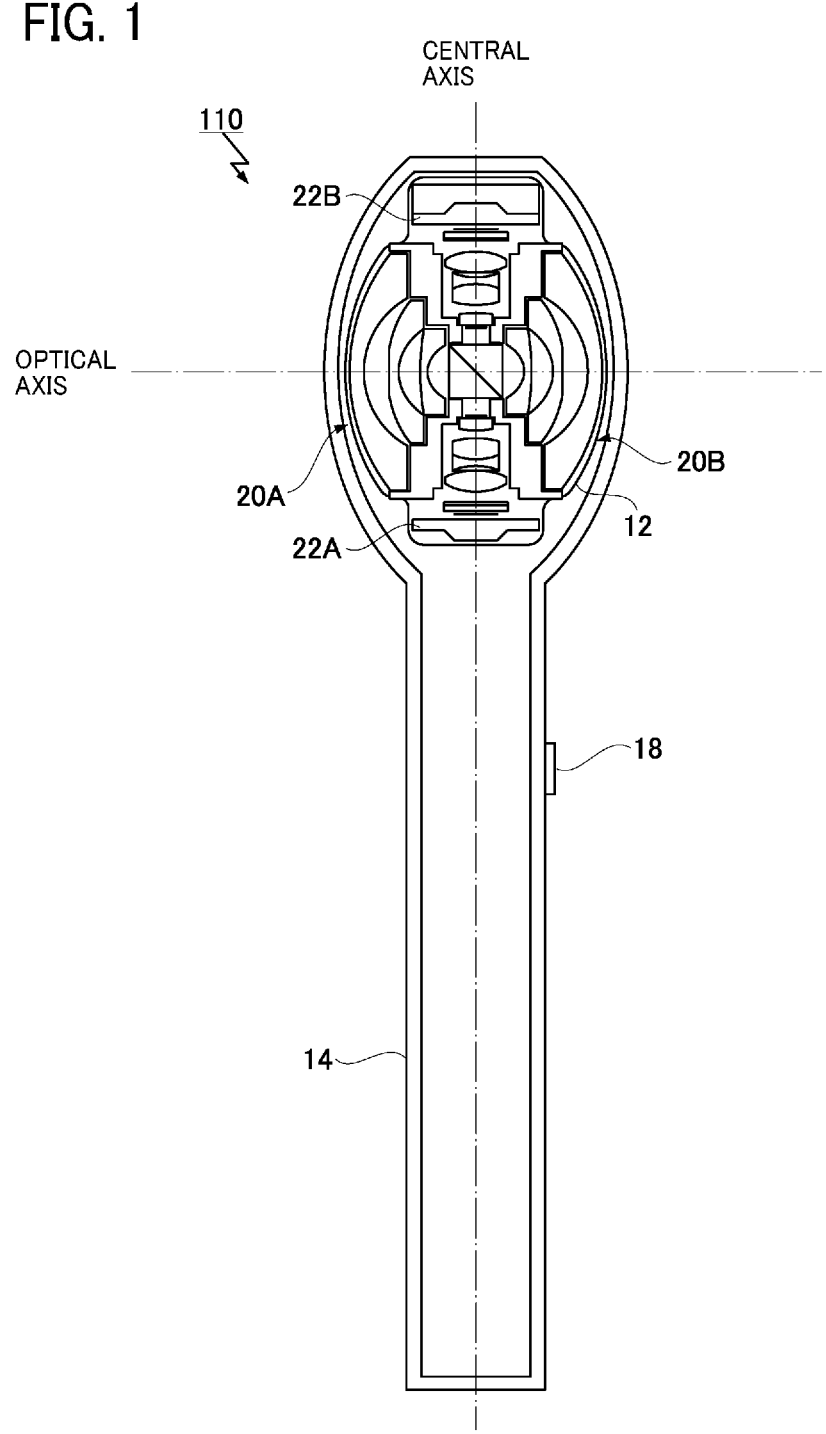
FIG. 1 is a cross-sectional view of an omnidirectional camera constituting an omnidirectional moving-image system according to an embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the following embodiments, an image processing apparatus and an image processing system are described using an omnidirectional camera and an omnidirectional moving-image system. Hereinafter, the overall configuration of an omnidirectional moving-image system 1000 according to an embodiment of the present disclosure will be described with reference to FIGS. 1 and 2.

FIG. 1 is a cross-sectional view of an omnidirectional camera 110 that constitutes the omnidirectional moving-image system 1000 according to an embodiment of the present disclosure. The omnidirectional camera 110 in FIG. 1 includes an imaging body 12, a housing 14 that holds the imaging body 12 and components such as a controller (a central processing unit (CPU 112)) and a battery, and a shutter button 18 provided on the housing 14. The imaging body 12 in FIG. 1 includes two image-forming optical systems 20A and 20B and two image sensors 22A and 22B. Examples of the image sensors 22A and 22B include charge-coupled devices (CCDs) and complementary metal oxide semiconductors (CMOSs). The image-forming optical systems 20A and 20B are hereinafter sometimes referred to collectively as an image-forming optical system 20. The image sensors 22A and 22B are hereinafter sometimes referred to collectively as an image sensor 22. Each of the image-forming optical systems 20A and 20B is configured as a fish-eye lens consisting of, for example, seven lenses in six groups. In the embodiment illustrated in FIG. 1, the above-mentioned fish-eye lens has a full angle of view of greater than 180 degrees (=360 degrees/n where n denotes the number of optical systems and n is 2). Preferably, the fish-eye lens in FIG. 1 has an angle of view of 190 degrees or greater. One of such wide-angle image-forming optical systems 20 (20A and 20B) is combined with corresponding one of the image sensors 22 (22A and 22B) to constitute a wide-angle imaging optical system (20 and 22).

The relative positions of the optical elements (lenses, prisms, filters, and aperture stops) of the two image-forming optical systems 20A and 20B are defined with reference to the image sensors 22A and 22B. More specifically, these elements are positioned such that the optical axis of the optical element of each of the image-forming optical systems 20A and 20B meets the central portion of the light receiving area of corresponding one of the image sensors 22 at the right angle and such that the light receiving area serves as the image-forming plane of corresponding one of the fish-eye lenses.

In the embodiment illustrated in FIG. 1, the image forming optical systems 20A and 20B have the same specification and are combined in directions reverse to each other such that the optical axes thereof match with each other. The image sensors 22A and 22B transform the light distribution of the received light into image signals, and sequentially output image frames to an image processing unit (an image processing block 116) of the controller (the CPU 112). As will be described later in detail, the images captured by the respective image sensors 22A and 22B are combined to generate an image over a solid angle of 4a steradian (hereinafter, such an image is referred to as a "spherical image"). The omnidirectional image is an image of all the directions that can be seen from an image capturing point. Thus-obtained consecutive frames of the omnidirectional image form an omnidirectional moving image. In the following embodiments, cases where an omnidirectional image and omnidirectional moving image are generated are described. In some embodiments, a full-circle image and a full-circle moving image, a panoramic image and a panoramic moving image obtained may be generated. Note that such a panoramic image and moving image are obtained by photographing 360 degrees only in a horizontal plane.

Figure 2A:
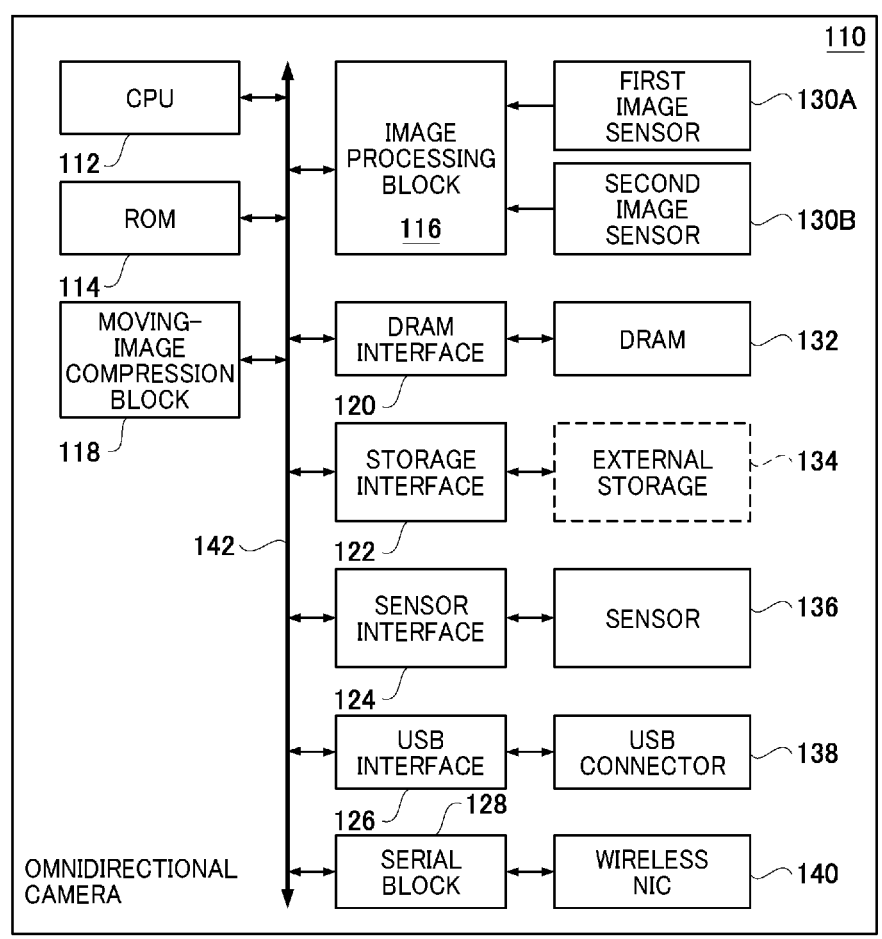
FIGS. 2A and 2B (FIG. 2) are block diagrams of a hardware configuration diagram of the omnidirectional moving-image system according to an embodiment of the present disclosure.

FIG. 2A is an illustration of a hardware configuration of the omnidirectional camera 110 that constitutes the omnidirectional moving-image system 1000 according to an embodiment of the present disclosure. The omnidirectional camera 110 corresponds to an image processing apparatus or an image-capturing device according to an embodiment to be described.

The omnidirectional camera 110 includes the CPU 112 (a first CPU), a read only memory (ROM) 114, an image processing block 116, a moving-image compressing block 118, a dynamic random access memory (DRAM) 132 that is connected thereto through a DRAM interface 120, and a sensor 136 that is connected thereto through a sensor interface 124.

The CPU 112 controls the operations of components of the omnidirectional camera 110. The ROM 114 stores therein a control program described in a code readable by the CPU 112 and various kinds of parameters. The image processing block 116 is connected to a first image sensor 130A and a second image sensor 130B (corresponding to the image sensors 22A and 22B in FIG. 1, respectively), and receives image signals of images captured by the image sensors 130A and 130B. The image processing block 116 includes, for example, an image signal processor (ISP), and applies, for example, shading correction, Bayer interpolation, white balance correction, and gamma correction to the image signals received from the image sensors 130A and 130B.

The moving-image compressing block 118 is a codec block for compressing and expanding a video such as video in MPEG-4 AVC/H.264 format. The DRAM 132 provides a storage area for temporarily storing data therein when various types of signal processing and image processing are applied.

The sensor 136 is a sensor for detecting three-axis acceleration components and three-axis angular velocity components. The detected acceleration component and angular velocity component are used to perform zenith correction of the omnidirectional image in the direction of gravity and rotation correction around the direction of gravity as described later. The sensor 136 may further include a sensor such as a geomagnetic sensor for obtaining, for example, an azimuth angle.

The omnidirectional camera 110 further includes a storage interface 122, a universal serial bus (USB) interface 126, and a serial block 128. The storage interface 122 is connected to an external storage 134. The storage interface 122 controls reading and writing to the external storage 134, such as a memory card inserted in a memory card slot. The USB interface 126 is connected to a USB connector 138. The USB interface 126 controls USB communication with an external device such as a smartphone via the USB connector 138. The serial block 128 controls serial communication with an external device such as a smartphone and is connected to a wireless network interface card (NIC) 140.

When the power is turned on by the operation of a power switch, the control program mentioned above is loaded into the main memory (the DRAM 132). The CPU 112 controls the operations of the parts of the device and temporarily stores the data required for the control in the memory according to the program read into the main memory. This operation implements functional units and processes of the omnidirectional camera 110, as will be described later.

Figure 2B:
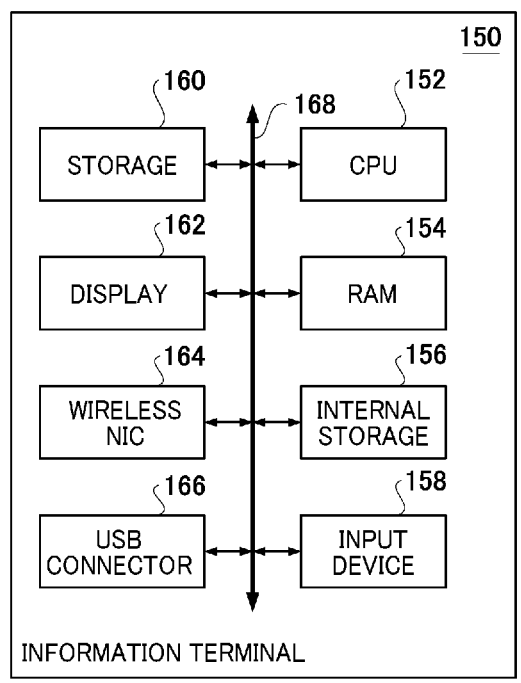

FIG. 2B is an illustration of a hardware configuration of the information terminal 150 of the omnidirectional moving-image system 1000 according to the present embodiment. The information terminal 150 is an example of an information processing apparatus according to an embodiment of the present disclosure.

The information terminal 150 in FIG. 2B includes a CPU 152, a RAM 154, an internal storage 156, an input device 158, a storage 160, a display 162, a wireless NIC 164, and a USB connector 166.

The CPU 152 controls the operations of each and entire component of the information terminal 150. The RAM 154 provides the work area of the CPU 152. The internal storage 156 stores a control program such as an operating system described with code that can be decrypted by the CPU 152 and an application that processes the information terminal 150 according to the present embodiment.

The input device 158 is an input device such as a touch screen and provides a user interface. The input device 158 accepts various instructions from the operator, for example, to correct the omnidirectional moving image. The storage 160 is a removable recording medium inserted, for example, into a memory card slot of the information terminal 150, and records various types of data, such as image data in a video format and still image data. The display 162 displays the corrected omnidirectional moving image on the screen in response to the user operation. The wireless NIC 164 provides a wireless communication connection with an external device such as the omnidirectional camera 110. The USB connector 166 provides a USB connection to an external device such as the omnidirectional camera 110.

When the information terminal 150 is powered on and the power supply is turned on, the control program is read from the internal storage 156 and loaded into the RAM 154. The CPU 152 control the operation of each part of the apparatus and temporarily stores the data required for the control in the memory, according to the control program read into the RAM 154. This operation implements functional units and processes of the information terminal 150, as will be described later.

Hereinafter, the omnidirectional moving-image correction function of the omnidirectional moving-image system 1000 according to the present embodiment are described with reference to FIGS. 3 to 6.

Figure 3:
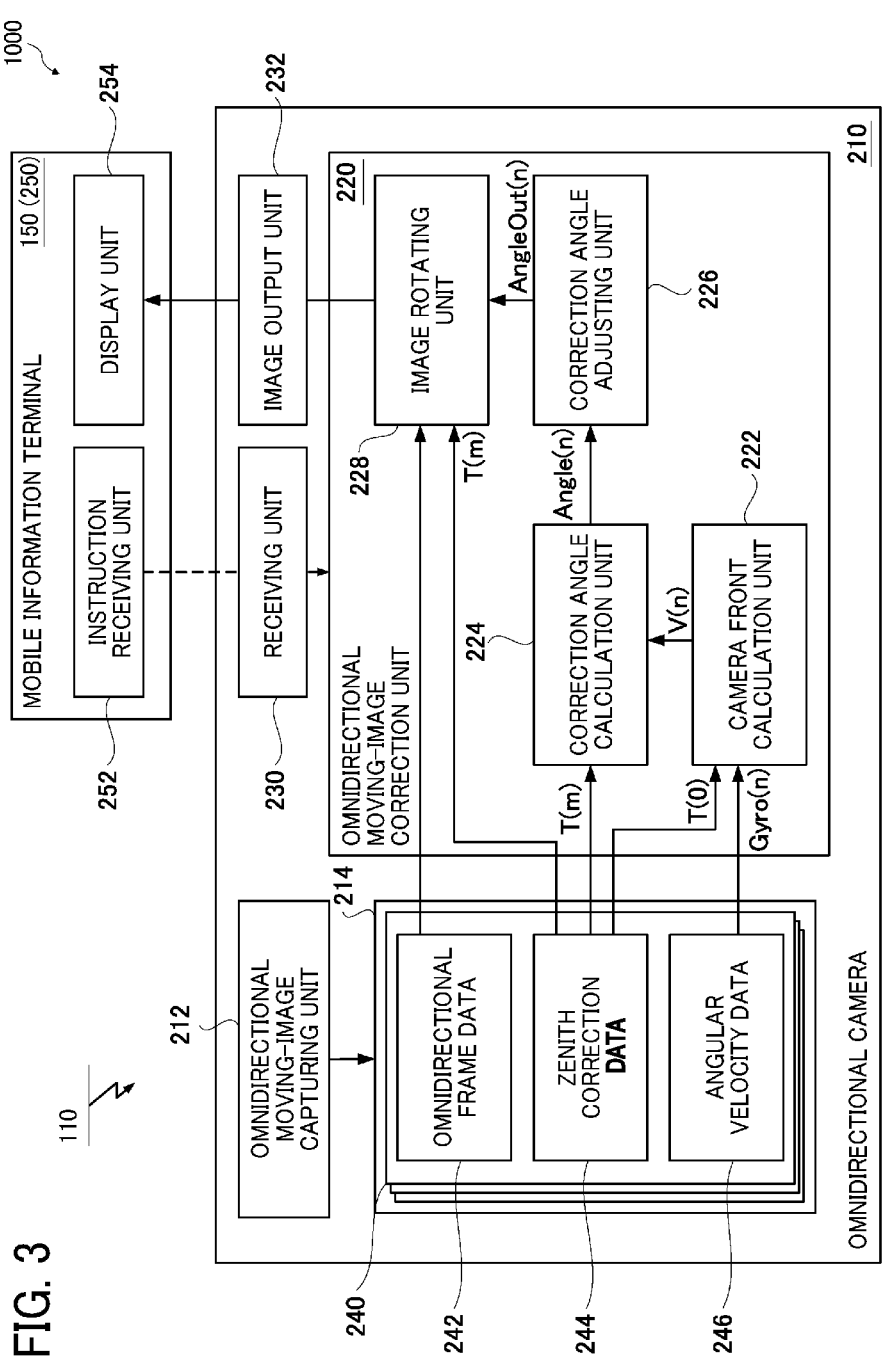
FIG. 3 is a block diagram of a functional configuration of an omnidirectional moving-image correction function implemented by the omnidirectional moving-image system according to an embodiment of the present disclosure.

FIG. 3 is an illustration of functional blocks related to an omnidirectional moving image correction function implemented on the omnidirectional moving-image system 1000 according to the present embodiment of the present disclosure. As illustrated in FIG. 3, the functional block 210 of the omnidirectional camera 110 includes an omnidirectional moving-image capturing unit 212, a storage unit 214, an omnidirectional moving-image correction unit 220 as a correction unit, a receiving unit 230, and an image output unit 232 as an output unit. Further, a functional block 250 of the information terminal 150 includes an instruction receiving unit 252 and a display unit 254.

The functional block 210 of the omnidirectional camera 110 is first described. The omnidirectional moving-image capturing unit 212 sequentially captures consecutive frames using the two image sensors 130A and 130B, and records the omnidirectional moving-image data 240 in the storage unit 214. Further, the omnidirectional moving-image capturing unit 212 measures acceleration components in the three axial directions and angular velocity components in the three axial directions using the sensor 136, and records the measured information as the metadata of the omnidirectional moving-image data 240.

The storage unit 214 stores one or more pieces of moving-image data 240 recorded by the omnidirectional moving-image capturing unit 212. The storage unit 214 serves as a part of a storage area of the external storage 134 or another storage in FIG. 2. As illustrated in FIG. 3, the omnidirectional moving-image data 240 includes omnidirectional frame data 242 as moving-image data captured by the omnidirectional camera 110, zenith correction data 244 that is time-series data of the inclination angle of the omnidirectional camera 110 with respect to the reference direction of the omnidirectional camera 110 during shooting, and angle velocity data 246 that is time-series data of the angle velocity of the omnidirectional camera 110 during the shooting operation.

The omnidirectional frame data 242 includes a plurality of frames constituting each omnidirectional moving image during the time from the start to the end of an imaging operation. That is, the omnidirectional frame data 242 is moving-image data that constitutes the omnidirectional moving-image data 240.

Figure 4B:
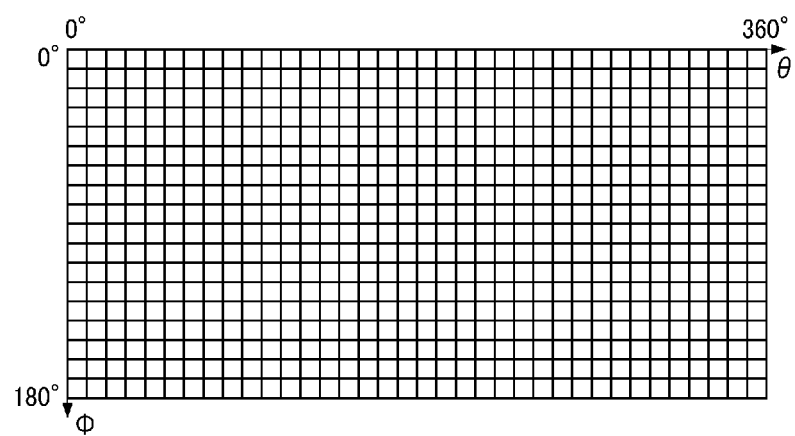
FIG. 4B is an illustration of a plane data configuration of an omnidirectional image generated by the omnidirectional moving-image system according to an embodiment of the present disclosure.

Hereinafter, a description will be given of how to generate an omnidirectional image and the generated omnidirectional image with reference to FIGS. 4A, 4B, and 4C. FIG. 4A is an illustration of data structure of each image and the data flow of the image in generating an omnidirectional image. First, an image directly captured by each of the image sensors 130A and 130B is an image that roughly covers a hemisphere of the whole sphere as a field of view. Light that passes through the image-forming optical system 20 is focused on the light receiving area of the image sensor 130 to form an image according to a predetermined projection system. The image sensor 130 is a two-dimensional image sensor defining a planar area of the light receiving area. Accordingly, the image formed by the image sensor 130 is image data represented by a plane coordinate system. Such a formed image is a typical fish-eye image that contains an image circle as a whole in which each captured area is projected, as illustrated in a fish-eye image A and a fish-eye image B in FIG. 4A.

A plurality of fish-eye images of each frame captured by the plurality of image sensors 130 is subjected to distortion correction and synthesis processing to form an omnidirectional image (spherical image) for each frame. In the synthesis processing, an omnidirectional image, which constitutes a complementary hemispherical portion, is generated from each planar fish-eye image. Then, the two omnidirectional images including the respective hemispherical portions are joined together by matching the overlapping areas of the hemispherical portions, and the omnidirectional images are synthesized to generate a full spherical (omnidirectional) image including the whole sphere.

FIG. 4B is an illustration of a plane data structure of the image data of an omnidirectional image used in the omnidirectional moving-image system according to an embodiment of the present disclosure. FIG. 4C is an illustration of a spherical data structure of the image data of an omnidirectional image used in the omnidirectional moving-image system according to an embodiment of the present disclosure. As illustrated in FIG. 4B, the image data of the omnidirectional image is expressed as an array of pixel values where the vertical angle φ corresponding to the angle with reference to a certain axis and the horizontal angle θ corresponding to the angle of rotation around the axis are the coordinates. The vertical angle φ ranges from 0° to 180° (alternatively from −90° to +90°), and the horizontal angle θ ranges from 0° to 360° (alternatively from −180° to +180°).

Figure 4C:
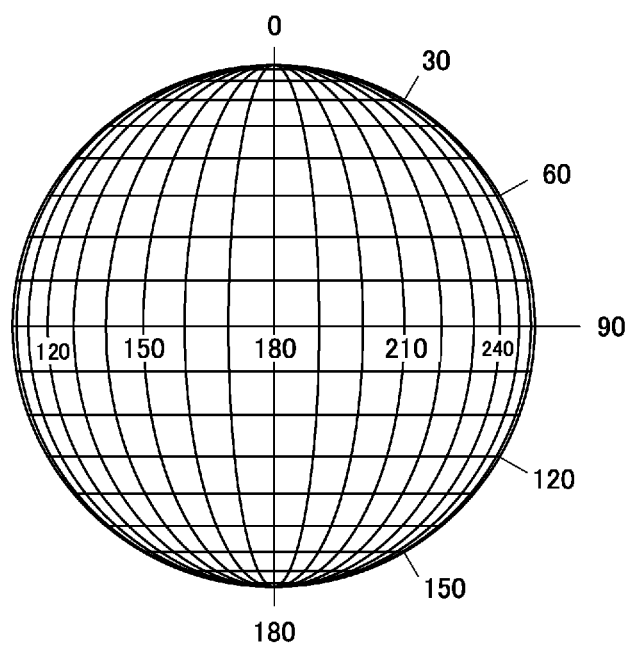
FIG. 4C is an illustration of a spherical data configuration of the omnidirectional image generated by the omnidirectional moving-image system according to an embodiment of the present disclosure.

As illustrated in FIG. 4C, the respective coordinate values (θ, φ) of the omnidirectional format (the spherical data structure of the image data) are associated with the points on the sphere that represents all directions from the photographing location. Thus, all directions are associated with the points on the omnidirectional images. The plane coordinates of the fish-eye image captured by a fish-eye lens are associated with the coordinates on the sphere of the omnidirectional image, which are included in a predetermined transformation table. The transformation table includes data prepared in advance by, for example, a manufacturer in accordance with a predetermined projection model based on design data of each lens optical system. The data of the transformation table is used for transforming a fish-eye image into an omnidirectional image.

In the description above, the omnidirectional frame data 242 is assumed to constitute an omnidirectional moving image. However, no limitation is intended thereby. There is no need for each frame to be recorded on the format of the synthesized omnidirectional image (synthesized omnidirectional image format) illustrated in FIG. 4C. In some embodiments, the omnidirectional frame data 242 is in any other form as long as the omnidirectional moving image can be constructed for reproduction.

For example, assuming that fish-eye images for each frame are subjected to distortion correction and synthesis processing to generate an omnidirectional image to be reproduced, moving-image data of two fish-eye images directly captured by the image sensors 130A and 130B (the respective pieces of moving-image data corresponding to the fish-eye image A and the fish-eye image B in FIG. 4A) is recorded as the omnidirectional frame data 242. Alternatively, moving-image data of a cemented image formed by joining together the two fish-eye images A and B (that is moving-image data of one image formed by joining together the fish-eye image A and the fish-eye image B arranged side by side) may be recorded as the omnidirectional frame data 242. In the following description, the omnidirectional frame data 242 is assumed to contain images of each frame in the distortion-corrected and synthesized omnidirectional image format, for convenience of description.

Further, the omnidirectional frame data 242 is not limited to moving-image data, and may be recorded in any form as long as a moving image can be reproduced. For example, the omnidirectional frame data 242 is recorded as moving-image data in which a plurality of frames are compressed in a certain codec such as H.264/MPEG-4 advanced video coding (AVC) or H.265/High Efficiency Video Coding (HEVC). Further, although Joint Photographic Experts Group (JPEG) is a format that expresses a moving image as continuous still images, the moving-image data may be recorded as a continuous series of still images of a plurality of frames.

The following description is made with reference to FIG. 3. The zenith correction data 244 is time-series data of the inclination angle of the omnidirectional camera 110 with respect to the reference direction of the omnidirectional camera 110 during the time from a start to an end of a shooting operation. The time series data is recorded in association with each frame of an omnidirectional image. The reference direction of the omnidirectional camera 110 is typically the direction of gravity in which acceleration of gravity is applied. The inclination angle with respect to the direction of gravity is generated based on the signal measured by the acceleration sensor included in the sensor 136. The inclination angle is typically configured as a vector of acceleration dimension values. Since the acceleration sensor does not distinguish between gravity and inertial force, preferably the inclination angle obtained from the acceleration sensor of the sensor 136 may be corrected based on the signal measured by the angular velocity sensor.

In the embodiments of the present disclosure, the inclination angles correspond to the frames on a one-by-one basis, and the inclination angles and the frames are recorded synchronously. However, the rate of the inclination angle to be recorded may not be the same as the frame rate. When the rate of the inclination angle is not the same as the frame rate, an inclination angle corresponding to the frame on a one-by-one basis is obtained by performing resampling at the frame rate.

The angular velocity data 246 is time-series data of the angular velocities generated around three axes of the angular velocity sensor of the omnidirectional camera 110 during the time from a start to an end of a shooting operation, measured by the angular velocity sensor of the sensor 136. The angular velocities may not be recorded in association with the frames. Typically, angular velocities faster than the frame rates are recorded in the angular velocity data 246. In this case, by using the time stamp, the relations between the frames and the inclination angles are obtained at a later time. Alternatively, the angular velocities may be recorded in association with the frames of the omnidirectional moving images, respectively.

The omnidirectional moving-image correction unit 220 reads out the omnidirectional moving-image data 240 stored in the storage unit 214, and applies zenith correction and rotation correction to each frame of the omnidirectional frame data 242 (in other words, the omnidirectional moving-image correction unit 220 rotates an image of each frame), thus outputting the corrected omnidirectional moving image data to another unit.

Figure 6A:
FIGS. 6A and 6B (FIG. 6) are illustrations of omnidirectional images obtained by performing the zenith correction and the rotation correction according to an embodiment of the present disclosure.
Figure 6B:

The following describes the zenith correction and the rotation correction with reference to FIGS. 5 and 6. FIG. 5 is an illustration of the zenith correction and the rotation correction applied to an omnidirectional image according to an embodiment of the present disclosure. FIGS. 6A and 6B are illustrations of an omnidirectional image obtained by performing the zenith correction and the rotation correction according to an embodiment of the present disclosure. FIG. 6A is an illustration of a frame of a moving image before the zenith correction is made, and FIG. 6B is an illustration of a frame of the moving image after the zenith correction is made.

As described above, the image data of an omnidirectional image format is expressed as an array of pixel values where the vertical angle φ corresponding to the angle with reference to a certain axis z0 and the horizontal angle θ corresponding to the angle of rotation around the axis z0 are the coordinates. If no correction is made, the certain axis z0 is defined with reference to the omnidirectional camera 110. For example, the axis z0 is defined as the central axis z0, which defines the horizontal angle θ and the vertical angle φ, passing through the center of the housing 14 from the bottom to the top where the top is the imaging body 12 side and the bottom is the opposite side of the omnidirectional camera 110 in FIG. 1. Further, for example, the horizontal angle θ of an omnidirectional image is defined such that the direction of the optical axis of the optical element of one of the image-forming optical system 20A and 20B is positioned at the center of the corresponding image sensor 22 at the horizontal angle θ.

The zenith correction (correction in the direction of roll and the direction of pitch) is correction processing that corrects the omnidirectional images (FIG. 6A) captured with the central axis z0 actually inclined with respect to the reference direction Z (the direction of gravity) as illustrated in the left illustration of FIG. 5, to an omnidirectional image (FIG. 6B) captured with the central axis z0 aligned with the reference direction Z as illustrated in the right illustration of FIG. 5. The rotation correction is a correction (correction in Yaw direction) that reduces rotational distortion around the reference direction Z (in the horizontal angle θ direction in FIGS. 6A and 6B) in the omnidirectional image to which the zenith correction has been made to have the central axis z0 aligned with the reference direction Z.

The operation of the omnidirectional moving-image correction unit 220 is described below in detailed with reference to FIG. 3. More specifically, the omnidirectional moving-image correction unit 220 includes a camera front calculation unit 222 (a first calculation unit), a correction angle calculation unit 224 (a second calculation unit), a correction angle adjusting unit 226 (a third calculation unit), and an image rotating unit 228.

Based on the zenith correction data 244 and the angular velocity data 246, the camera front calculation unit 222 calculates time-series values of the front direction (the direction of the optical axis of one of the image-forming optical systems 20A and 20B) of the omnidirectional camera 110. More specifically, the camera front calculation unit 222 first calculates the front direction V (0) (first front direction) of the omnidirectional camera 110 in capturing the leading frame (at the first time), based on a value T (0) of the inclination angle of the leading frame included in the zenith correction data 244. After obtaining the front direction V (0) for the leading frame, the camera front calculation unit 222 calculates the time-series values of the front direction V(n) of the omnidirectional camera 110 over a plurality of times corresponding to the respective frames based on the angular velocity Gyro (n) of the angular velocity data 246, starting from the initial value V (0). The front direction V(n) is obtained by integrating infinite small rotation corresponding to the angular velocity of each axis, starting from the front direction V (0) for the leading frame. The calculated time-series values of the front direction V(n) are transmitted to the correction angle calculation unit 224.

Based on the inclination angle data T(m) of the zenith correction data 244, the correction angle calculation unit 224 calculates the correction angle Angle (n) of rotation around the reference direction Z in capturing each frame, from the front direction V(n) of the omnidirectional camera 110 in capturing each corresponding frame. The calculated correction angle Angle (n) is transmitted to the correction angle adjusting unit 226.

The correction angle adjusting unit 226 adjusts the calculated correction angle Angle (n) for each frame to achieve a successful natural correction operation. The obtained (calculated) correction angle Angle (n) is typically within a prescribed domain (for example, from −180 degrees to +180 degrees). Accordingly, the correction angle Angle (n) might change from the vicinity of +180 degrees to the vicinity of −180 degrees (or in the opposite direction from the vicinity of −180 degrees to the vicinity of +180 degrees) when viewed as a time-series values. In view of such a situation, the correction angle adjusting unit 226 detects a change of the correction angle Angle (n) from the vicinity of the upper limit to the vicinity of the lower limit (from the vicinity of the lower limit to the vicinity of the upper limit) of the domain based on the amount of change in the correction angle Angle (n) between continuously obtained correction angles. In other words, the correction angle adjusting unit 226 detects a change of the correction angle Angle (n) from an extreme to another extreme of the domain of the correction angle. Based on such a detection, the correction angle adjusting unit 226 adds or subtracts an adjustment value to or from the correction angle Angle (n) for each frame. With such a configuration, the domain of the correction angle is expanded and the continuity of the time-series correction angles. Further, the correction angle adjusting unit 226 (a filtering unit) performs a filtering process on the correction angles within the expanded domain to allow for passage of only frequency component within a predetermined frequency range, preferably a high frequency component. The corrected angle Angle Out (n) on which the filtering process has been performed is transmitted to the image rotating unit 228.

Based on the zenith correction data 244, the image rotating unit 228 performs the zenith correction on an omnidirectional image for each of the plurality of frames of the omnidirectional frame data 242. At the same time, the image rotating unit 228 according to the present embodiment rotates the images based on the calculated correction angles Angle Out (n) for the plurality of frames, so as to reduce the rotational distortion around the reference direction Z within the range of the predetermined frequency.

When the image of each frame in the omnidirectional frame data 242 is an image of the synthesized omnidirectional image format, the image rotating unit 228 transforms the rotational coordinates of the omnidirectional image for each frame. When each frame in the omnidirectional frame data 242 includes a plurality of fish-eye images before the synthesis, the image rotating unit 228 applies the zenith correction and the rotation correction to each frame, and also transforms the plurality of fish-eye images into an omnidirectional image.

The receiving unit 230 receives various requests from the information terminal 150 communicable with the omnidirectional camera 110. Upon receipt of a request to correct an omnidirectional moving image from the information terminal 150 (for example, a request to output a corrected omnidirectional moving image for reproduction), the receiving unit 230 transfers the request to the omnidirectional moving-image correction unit 220. In response to the request to correct the omnidirectional moving image, the omnidirectional moving-image correction unit 220 starts performing the zenith correction and the rotation correction on the designated omnidirectional moving-image data 240 to output the corrected image data. The image output unit 232 outputs the image data of the omnidirectional moving image based on the plurality of frames on which the zenith correction and the rotation correction has been performed by the omnidirectional moving-image correction unit 220, to the information terminal 150 of the request source. In this case, the image data may be encoded in a predetermined moving-image compression format based on the corrected omnidirectional images for the respective plurality of frames, and output as final moving-image data or as a series of still images.

The information terminal 150 is a terminal device such as a smartphone, a tablet computer, and a personal computer in which an application for communicating with the omnidirectional camera 110 to view and reproduce omnidirectional images is installed. The information terminal 150 receives various instructions from the operator via the application and issues various requests to the omnidirectional camera 110. In response to accepting an instruction of the operator to correct the omnidirectional moving image designated by the operator (for example, an instruction to reproduce a moving image while correcting), the instruction receiving unit 252 of the information terminal 150 issues, to the omnidirectional camera 110, a request to output moving-image data of a certain corrected omnidirectional moving image. The display unit 254 of the information terminal 150 displays an omnidirectional moving image on the display device such as the display 162 of the information terminal 150 based on the image data of the omnidirectional moving image output from the omnidirectional camera 110.

Note that the information terminal 150 displays any desired type of image based on the corrected image data. For example, the omnidirectional image as is may be displayed on the display device. Alternatively, the omnidirectional image may be pasted on the spherical object, and images captured when the spherical object is observed with a camera of a predetermined viewing angle from a predetermined position are displayed as frames to display a moving image.

In the present embodiment, the zenith correction and rotation correction processes are actually performed using the resources of the omnidirectional camera 110, not the information terminal 150, and the correction result is output to the information terminal 150 to display a corrected image. With this configuration, regardless of the processing performance of the information terminal 150, it is possible to stably reproduce moving-images reproduction while applying zenith correction and rotation correction to images.

In the embodiments of the present disclosure, the cases where the image data of the omnidirectional moving image is transmitted to the information terminal 150 are described. However, no limitation is intended thereby. When the omnidirectional camera 110 includes a display device, the display device of the omnidirectional camera 110 may display an omnidirectional moving image. Alternatively, the image data of the omnidirectional moving image may be stored as another file.

The rotation correction is described below in more detail according to an embodiment of the present disclosure with reference to FIGS. 7 and 8. FIG. 7 is a flowchart of an omnidirectional moving-image correction processing performed by the omnidirectional camera 110 that constitutes the omnidirectional moving-image system 1000 according to an embodiment of the present disclosure. FIGS. 8A and 8B are illustrations for explaining a method of calculating a front vector for the rotation correction according to an embodiment of the present disclosure.

In the processing illustrated in FIG. 7, the omnidirectional camera 110 starts the processing in response to a receipt of the request to output moving-image data of a corrected certain omnidirectional moving image from the information terminal 150 that externally communicates with the omnidirectional camera 110.

In step S101, the omnidirectional camera 110 reads the omnidirectional moving-image data 240 designated by the received request. In this case, the omnidirectional moving-image data 240 read by the omnidirectional camera 110 includes the omnidirectional frame data 242 that constitutes the omnidirectional moving-image data 240 and metadata including the zenith correction data 244 and the angular velocity data 246.

In step S102, the omnidirectional camera 110 calculates the front direction V (0) of the omnidirectional camera 110 for the leading frame (in capturing the leading (first) frame) based on the inclination angle vector T (0) of the leading frame in the zenith correction data 244. First, a quaternion Q (0) of the inclination angle vector T (0) of the leading frame and the direction of gravity vector G=(0, 0, 1) are generated. The inclination angle vector T (0) represents the rotational displacement between the global coordinate system for the leading (first) frame and the local coordinate system of the omnidirectional camera 110. The rotational axis A (0) and the rotation angle θ(0) of the quaternion Q (0) are expressed by the following formulas (1) and (2). Then, the quaternion Q (0) represents the rotation of the rotation angle θ(0) about the rotation axis A (0) as illustrated in FIG. 8A.

$$A(0) = \frac{G \times T(0)}{|G \times T(0)|} \quad (1)$$

$$\theta(0) = \mathrm{acos}\left(\frac{G \cdot T(0)}{|G||T(0)|}\right) \quad (2)$$

Figure 8A:
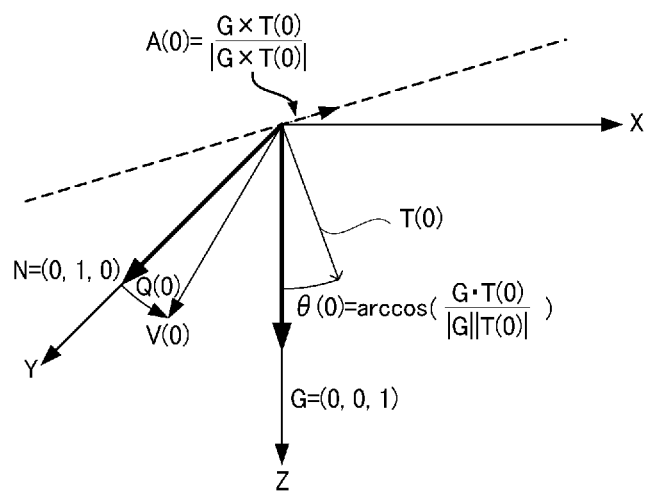
FIGS. 8A and 8B (FIG. 8) are illustrations of a method of calculating a front vector used for the rotation correction according to an embodiment of the present disclosure.

As illustrated in FIG. 8A, the global front vector (0, 1, 0) is rotated with the obtained quaternion Q (0) to obtain the initial value V (0) of the front direction vector of the omnidirectional camera 110. In this case, assuming that the central axis z0 of the omnidirectional camera 110 is aligned with the Z axis (direction of gravity) of the global coordinate system and the front direction (the optical axis of one optical system) of the omnidirectional camera 110 is aligned with Y axis of the global coordinate system, the initial value V (0) of the front direction vector that indicates the front of the omnidirectional camera 110 in an inclined state.

In step S103, the omnidirectional camera 110 calculates time-series values of the front direction vector V(n) of the omnidirectional camera 110 over a plurality of time points corresponding to the respective frames, based on the angular velocity data 246. The front direction vector V(n) at each time point is obtained by calculating the time difference between sampling processes in the angular velocity data 246 and integrating infinite small rotation corresponding to the angular velocity Gyro (n) about three axes for each sampling. Although sampling intervals might vary due to the load on the omnidirectional camera 110, the time difference between sampling can be suitably obtained from the time stamp. In step S103, as illustrated in FIG. 8B, the time-series values of the front direction vector V(n) are calculated, starting from the front direction vector V (0) with which the leading (first) frame is captured.

In the loop of steps S104 to S110, the zenith correction and rotation correction are applied for each frame while calculating the correction angle for the rotation correction.

In step S105, the omnidirectional camera 110 searches the camera front direction vector V(n) corresponding to the frame of interest and calculates the correction angle for the rotation correction based on the zenith correction data 244. Typically, the angular velocity data 246 has a sampling rate different from the frame rate, in which a front direction vector V close to the time stamp and corresponding to a frame of interest of the zenith correction data 244 is searched.

In this case, it is assumed that the front direction vector V(n) corresponds to the m-th frame. First, quaternion Q(m) is obtained from the inclination angle vector T(m) of the m-th frame. The rotation axis A(m) and the rotation angle θ(m) of the quaternion Q(m) are expressed by the following formulas (3) and (4) same as in the formulas (1) and (2).

$$A(m) = \frac{G \times T(m)}{|G \times T(m)|} \quad (3)$$

$$\theta(0) = \acos\left(\frac{G \cdot T(m)}{|G||T(m)|}\right) \quad (4)$$

Figure 8B:
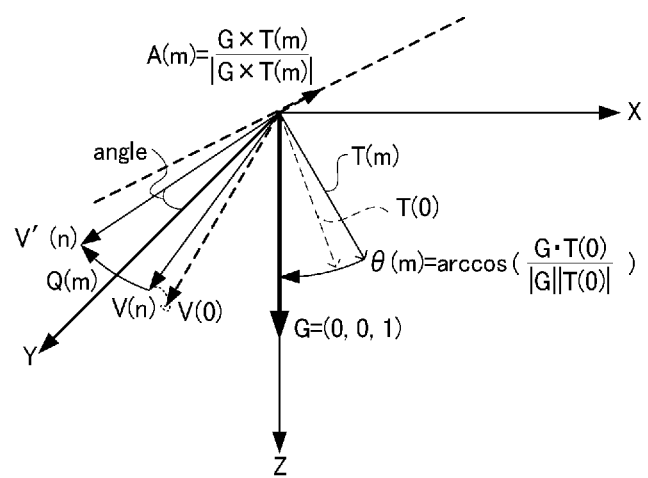

Then, as illustrated in FIG. 8B, the front direction vector V(n) corresponding to the m-th frame is rotated with the quaternion Q (m) to obtain the front direction vector V'(n). As a result, the direction in which the front face vector V(n) of the camera faces after zenith correction is obtained. Then, based on the obtained vector V'(n), the correction angle Angle(n) is obtained within the XY plane of the global coordinate, using the following formula.

$$\text{Angle}(n) = a\tan 2(V'x(n), V'y(n)) \quad (5)$$

In this case, the function a tan 2 (x coordinate and y coordinate) in the formula (5) above is a function that returns the arc tangent in the range of −180 degrees to 180 degrees (−π to π).

In step S106, as a pre-process of the high-pass filter, the omnidirectional camera 110 adjusts the correction angle obtained in step S105 to maintain the continuity of the correction angles, and thus calculates a correction angle AngleIn (n) after the adjustment.

In the embodiments described above, the correction angle Angle (n) is obtained as a value within the range of −180° to +180° by the arc tangent. In such a case, the correction angle Angle (n) may change from the vicinity of +180 degrees to the vicinity of −180 degrees (or in the opposite direction from the vicinity of −180 degrees to the vicinity of +180 degrees) when viewed as a time-series values. In step S106, as indicated by the following pseudocode, the omnidirectional camera 110 (an addition-subtraction unit) detects a change of the correction angle Angle (n) from the vicinity of the upper limit to the vicinity of the lower limit (from the vicinity of the lower limit to the vicinity of the upper limit) of the domain based on the amount of change in the correction angle Angle (n) between continuously obtained correction angles. In other words, a change of the correction angle Angle (n) from an extreme to another extreme of the domain is detected. Based on such a detection, an adjustment value is added to or subtracted by the addition-subtraction unit from the correction angle Angle (n) for each frame. In the following pseudocodes, the "threshold" is a threshold for the amount of change of the correction angle Angle (n) to detect the change of the correction angle from the vicinity of the upper limit to the vicinity of the lower limit (from the vicinity of the lower limit to the vicinity of the upper limit) of the domain. The last code "Angle(0)" in the following formula is the initial value of the correction angle obtained by the above formula (5). Based on the correction angle Angle(0), the correction is performed. In the following pseudocodes, "$(n_{-1})$" corresponds to the frame immediately before the frame to which n corresponds.

```
if (angle(n) − angle(n_-1) > threshold) {
    AdjustAngle(n) = AdjustAngle(n_-1) − 360
} else if (angle(n) − angle(n_-1) < −threshold){
    AdjustAngle(n) = AdjustAngle(n_-1) + 360
} else{
    AdjustAngle(n) = AdjustAngle(n_-1)
}
AngleIn(n) = Angle(n) + AdjustAngle(n) − Angle(0)
```

In step S107, the omnidirectional camera 110 performs a high-pass filtering process on the adjusted correction angle AngleIn (n) for the frame of interest to allow for passage of the high-frequency component. Thus, the filtered correction angle AngleOut (n) after the filtering process is obtained. The filtered correction angle AngleOut (n) is obtained by the following formula. The symbol "P" in the following formula is a sampling period, and the symbol "Hc" is a cutoff frequency. In the following formula, $(n_{+1})$ corresponds to the frame immediately after the frame corresponding to "n".

$$\text{AngleOut}(n) = \text{AngleIn}(n) - \sum \frac{\text{Angle}(n)}{t}$$

$$\sum \text{Angle}(n_{+1}) = \sum \text{Angle}(n) + \text{AngleOut}(n)$$

$$t = P / (2\pi * Hc)$$

In step S108, in addition to the zenith correction, the omnidirectional camera 110 performs the rotation correction on the frame of interest in the omnidirectional frame data 242, based on the calculated correction angle and a corresponding inclination vector T (m) in the zenith correction data 244, so as to reduce the rotational distortion around the reference direction due to the high-frequency component. In step S109, the omnidirectional camera 110 outputs a frame of the omnidirectional image that has been subjected to the rotational transformation.

When the processes of steps S105 to S109 are performed on all the frames included in the omnidirectional moving-image data 240, the loop of steps S104 to S110 ends and the correction processing ends.

When the omnidirectional camera 110 is properly placed in the vertical direction (the omnidirectional camera 110 is not inclined with reference to the reference direction (direction of gravity)), it is possible to shoot an omnidirectional image such that the zenith is aligned with the horizontal line, which is recognized by the shooter, as illustrated in FIG. 6B. In general, however, it is difficult to capture an image with the position and posture secured accurately while holding the camera with a hand. If an image is captured with the camera body inclined, the zeniths of the images are misaligned and the horizontal line is distorted unless the zenith correction is performed, as illustrated in FIG. 6A. If the camera body rotates due to, for example, camera shake, the image blurs along the horizontal line unless the rotation correction is performed.

However, in the embodiments according to the present disclosure, the images for all the frames are subjected to the transformation process (the correction processing) such that the reference direction Z such as the direction of gravity is aligned with the central axis z0 of the omnidirectional camera 110 and such that the rotational distortion of an image around the reference direction Z is reduced. With such a configuration, the viewer can view the corrected omnidirectional moving image without feeling uncomfortable.

As described above, the configuration according to the above-described embodiments can provide an image processing apparatus capable of effectively correcting rotational blur of an image around a prescribed reference direction, an image processing system incorporating the image processing apparatus, and carrier means.

Particularly, the rotation correction is performed using angular velocity data stored as metadata in shooting, which can reduce the load during the shooting. Further, it is possible to decide to not perform the rotation correction or to perform the rotation correction so as to prevent only a very small component, at the time of reproduction.

In the above-described embodiments, the omnidirectional camera 110 are described as an example of an image processing apparatus. With the configuration that performs the substantive processing of the zenith correction and the rotation correction using the resources of the omnidirectional camera 110, a moving image can be stably reproduced while applying zenith correction and rotation correction to images, regardless of the processing performance of the apparatus that serves to reproduce the moving image. However, the image processing apparatus may not be an image-capturing device such as the omnidirectional camera 110. In some other embodiments, an information processing apparatus such as a personal computer different from the omnidirectional camera 110 may be used as the image processing apparatus.

In the above-described embodiment, the cases where two partial images captured by the lens optical systems each having an angle of view greater than 180 degrees are superimposed and synthesized are described. However, no limitation is intended thereby. In some other embodiments, three or more partial images captured by one re more lens optical systems may be superimposed on each other and synthesized. Further, the configuration according to the above-described embodiments are applied to an imaging system equipped with a fish-eye lens. Alternatively, the configuration according to the embodiments of the present disclosure is applicable in an omnidirectional moving-image imaging system equipped with a super-wide-angle lens.

Further, in the above-described embodiments, the cases where the omnidirectional camera 110 is separate from the information terminal 150 in the omnidirectional moving-image system 1000. However, no limitation is intended thereby. In some embodiments, the omnidirectional camera 110 may be combined with the information terminal 150 in the omnidirectional moving-image system 1000.

Further, in the above-described embodiments, the omnidirectional camera 110 is not inclined when the direction of gravity is aligned with the central axis of the omnidirectional camera 110. However, no limitation is intended thereby. Instead of the direction of gravity, for example, the horizontal direction or another desired direction may be set as a reference direction, and the inclination of the image may be corrected based on the inclination of a prescribed object, such as the omnidirectional camera 110 or the image sensor 130A or 130B, with reference to the reference direction.

The functional blocks as described above are implemented by a computer-executable program written by programming languages such as an assembler language, C, and object-oriented programming languages such as C++, C #, and Java (registered trademark). The program may be distributed via a telecommunication line as being stored in a computer-readable storage medium such as a ROM, an electrically erasable and programmable read only memory (EEPROM), an electrically programmable read only memory (EPROM), a flash memory, a flexible disk, a compact disc read only memory (CD-ROM), a compact disc rewritable (CD-RW), a digital versatile disk (DVD)-ROM, a DVD-RAM, a DVD-RW, a Blu-ray disc, a secure digital (SD) card, and a magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein. The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus en-compasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device. Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The illustrated apparatuses are only illustrative of one of several computing environments for implementing the embodiments disclosed herein. For example, in some embodiments, the image-capturing device includes a plurality of computing devices, e.g., a server cluster, that are configured to communicate with each other over any type of communications link, including a network, a shared memory, etc. to collectively perform the processes disclosed herein. Similarly, the image processing apparatus can include a plurality of computing devices that are configured to communicate with each other.

Moreover, the image-capturing device and the image processing apparatus can be configured to share the processing steps disclosed, e.g., in FIG. 7, in various combinations. For example, the processes performed by the correction unit can be performed by the image processing apparatus. Similarly, the functionality of the correction unit can be performed by the image processing apparatus. Further, the illustrated elements of the image-capturing device and the image processing apparatus can be combined into a single server apparatus, or divided between a plurality of machines in combinations other than that shown in any of the above-described figures.

CROSS-REFERENCE TO RELATED APPLICATION

This patent application is based on and claims priority pursuant to 35 U.S.C. § 119(a) to Japanese Patent Application No. 2017-242107, filed on Dec. 18, 2017 in the Japan Patent Office, the entire disclosure of which is hereby incorporated by reference herein.

REFERENCE SIGNS LIST

12 Imaging body
14 Housing
18 Shutter button
20 Image-forming optical system
22, 130 Image sensor
110, 130 Omnidirectional camera
112, 152 CPU
114 ROM
116 Image processing block
118 Moving-image compression block
120, 126 Interface
122 Storage interface
124 Sensor interface
126 USB interface
128 Serial block
132 DRAM
134 External storage
136 Sensor
138, 166 USB connector
150 Information terminal
154 RAM
156 Internal storage
158 Input device
160 Storage
162 Display
164 Wireless NIC
210, 250 Functional block
212 Omnidirectional moving-image capturing unit
214 Storage unit
220 Omnidirectional moving-image correction unit
222 Camera front calculation unit
224 Correction angle calculation unit
226 Correction angle adjusting unit
228 Image rotating unit
230 Receiving unit
232 Image output unit
240 Omnidirectional moving-image data
242 Omnidirectional frame data
244 Zenith correction data
246 Angular velocity data
252 Instruction receiving unit
254 Display unit

The invention claimed is:

1. An image processing apparatus, comprising:
a memory to store moving-image data including a plurality of frames captured by an image-capturing device communicable with the image processing apparatus, time-series data of an inclination angle of the image-capturing device with reference to a reference direction, wherein the reference direction is a direction of gravity, and time-series data of an angular velocity of the image-capturing device; and
circuitry configured to perform a zenith correction on an omnidirectional image of each of the plurality of frames of the moving-image data based on the time-series data of the inclination angle, and, based on the time-series data of the angular velocity, perform rotation correction to rotate the zenith-corrected omnidirectional image of each of the plurality of frames of the moving-image data by a calculated correction angle within a plane perpendicular to the reference direction to reduce a rotational distortion around the reference direction within a prescribed frequency range, the correction angle being calculated based on both the times-series data of the inclination angle and the time-series data of the angular velocity, and output image data of the rotated omnidirectional image of each of the plurality of frames to an external device communicable with the image processing apparatus.

2. The image processing apparatus according to claim 1, wherein, in response to a request, from the external device, to output a moving image of the rotated image of each of the plurality of frames, the circuitry is further configured to start rotating an image of each of the plurality of frames of the moving-image data to output image data of the rotated image of each of the plurality of frames.

3. The image processing apparatus according to claim 1, wherein the circuitry is further configured to:
calculate an initial front direction of the image-capturing device at an initial time based on a value of the time-series data of the inclination angle at the initial time;
calculate time-series values of a front direction of the image-capturing device over a plurality of times after the initial time and corresponding to the plurality of frames, based on the calculated initial front direction and the time-series data of the angular velocity; and
calculate the correction angle at each of the plurality of times in rotating the image from the calculated front direction at each of the plurality of times, based on the time-series data of the inclination angle, wherein each front direction is a direction of the optical axis of the image-capturing device at a corresponding time of the plurality of times.

4. The image processing apparatus according to claim 3, further comprising a filter configured to perform a filtering process on the calculated correction angle at each of the plurality of times to allow for passage of a high-frequency component within the prescribed frequency range.

5. The image processing apparatus according to claim 3, wherein the circuitry is further configured to detect a change of the correction angle from a first limit of a predetermined domain of the correction angle to a second limit of the predetermined domain of the correction angle, and to add or subtract an adjustment value to or from the correction angle.

6. The image processing apparatus according to claim 3, wherein the circuitry is further configured to obtain the front direction at each of the plurality of times by integrating an infinitely small rotation corresponding to the angular velocity at each axis of the time-series data of the angular velocity, starting from the initial front direction at the initial time.

7. An image processing system, comprising:
a memory to store moving-image data including a plurality of frames captured by an image-capturing device communicable with an image processing apparatus, time-series data of an inclination angle with reference to a reference direction of the image-capturing device, wherein the reference direction is a direction of gravity, and time-series data of an angular velocity of the image-capturing device; and
circuitry configured to perform a zenith correction on an omnidirectional image of each of the plurality of frames of the moving-image data based on the time-series data of the inclination angle, and, based on the time-series data of the angular velocity, perform rotation correction to rotate the zenith-corrected omnidirectional image of each of the plurality of frames of the moving-image data by a calculated correction angle within a plane perpendicular to the reference direction to reduce a rotational distortion around the reference direction within a prescribed frequency range, the correction angle being calculated based on both the times-series data of the inclination angle and the time-series data of the angular velocity, and output image data of the rotated omnidirectional image of each of the plurality of frames to an external device communicable with the image processing apparatus.

8. The image processing system according to claim 7, further comprising:
the image-capturing device including the memory, and the circuitry; and an information processing apparatus communicable with the image-capturing device, the information processing apparatus comprising:
a receiver to receive a request to output the rotated moving-image;
a display to display image data output from the image-capturing device;
wherein, in response to a request, from the external device, to output a moving image of the rotated image of each of the plurality of frames, the circuitry is further configured to start rotating an image of each of the plurality of frames of the moving-image data to output image data of the rotated image of each of the plurality of frames.

9. A method of processing an image, the method comprising:
storing moving-image data including a plurality of frames captured by an image-capturing device communicable with an image processing apparatus, time-series data of an inclination angle with reference to a reference direction of the image-capturing device, wherein the reference direction is a direction of gravity, and time-series data of an angular velocity of the image-capturing device;
performing a zenith correction on an omnidirectional image of each of the plurality of frames of the moving-image data based on the time-series data of the inclination angle;
based on the time-series data of the angular velocity, performing rotation correction to rotate the zenith-corrected omnidirectional image of each of the plurality of frames of the moving-image data by a calculated correction angle within a plane perpendicular to the reference direction to reduce a rotational distortion around the reference direction within a prescribed frequency range, the correction angle being calculated based on both the times-series data of the inclination angle and the time-series data of the angular velocity;
outputting image data of the rotated omnidirectional image of each of the plurality of frames to an external device communicable with the image processing apparatus.

10. The image processing apparatus of claim 1, wherein
the zenith correction performed by the circuitry corrects each omnidirectional image of the plurality of frames in roll and pitch directions with respect to the direction of gravity, based on the time-series data of the inclination angle; and
the rotation correction performed by the circuitry corrects each omnidirectional image of the plurality of frames in a yaw direction with respect to the direction of gravity, based on the calculated correction angle, to reduce the rotational distortion.

* * * * *